3,318,728
TRIAZOLE POLYMER COATED METAL ARTICLES
Marvin R. Lilyquist, Raleigh, N.C., assignor to Monsanto Company, St. Louis, Mo., a corporation of Delaware
No Drawing. Filed July 12, 1963, Ser. No. 294,758
17 Claims. (Cl. 117—132)

This invention relates to coated metal articles. More particularly, this invention relates to improved coating compositions which may be applied to metal articles as protective coatings, insulating coatings, adhesive coatings, and the like.

Most metals when subjected to high temperatures, those above 200° C., tend to oxidize at a greatly increased rate. This oxidation severely limits their use in many high temperature applications in which the temperature ranges reach above 200° C. Therefore, it is highly desirable to protect the metal surfaces with coatings which will resist oxidative degradation at elevated temperatures. Such coating materials should be stable to oxidation at elevated temperatures, adhere well to the metal surface, be flexible and be sufficiently hard so as to resist damages by impact or abrasion, and the like.

It is an object of this invention to provide a coating for metal surfaces that will afford protection against oxidation and other degradative processes at elevated temperatures.

It is a further object of this invention to provide a coating for metal surfaces which will resist abrasion at elevated temperatures.

It is another object of this invention to provide a coating for metal surfaces that will afford thermal and electrical insulation for said metal surfaces.

It is another object of this invention to provide compositions that may serve as adhesives between metal surfaces.

Other objects will be apparent from the following detailed description of the invention.

In general the objects of this invention are accomplished by providing a metal surface with a relatively thin adherent continuous coating of a high molecular weight triazole polymer.

The high molecular weight triazole polymers that are employed as coatings in the practice of the present invention are compounds comprised predominantly of regularly recurring units having the general formula

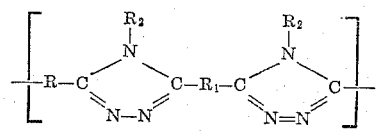

wherein R and $R_1$, being the same or different, are substituted or unsubstituted divalent cyclic radicals selected from single, multiple, and fused ring radicals, $R_2$ is a member selected from the group consisting of a hydrogen, a substituted or unsubstituted alkyl radical, and a substituted or unsubstituted cyclic radical. Illustrative of triazole polymers that may be employed as coatings in the practice of this invention are:

poly-3,5(1,3-, 1,4-phenylene)4-phenyl-1,2,4-triazole,
poly-3,5(1,3-, 1,4-phenylene)4-hydro-1,2,4-triazole,
poly-3,5(1,3-, 1,4-phenylene)4-(4-pyridyl)-1,2,4-triazole,
poly-3,5(1,3-phenylene)4-methyl-1,2,4-triazole,
poly-3,5(1,3-phenylene)4-phenyl-1,2,4-triazole,
poly-3,5(1,4-phenylene)4-phenyl-1,2,4-triazole,
poly-3,5[(1,3-phenylene),(2,6 - naphthylene)]4 - phenyl-1,2,4-triazole,
poly-3,5[(1,3 - phenylene),(2,6-naphthylene)]4-methoxyphenyl-1,2,4-triazole,
poly - 3,5[(1,3 - phenylene),(4,4'-biphenylene)]4-phenyl-1,2,4-triazole,
and the like. Generally, the high molecular weight triazole polymers used as coatings in this invention are prepared by the conversion of a high molecular weight hydrazide polymer to the corresponding triazole polymer by a cyclocondensation reaction with an excess of an organic primary amine or ammonia in the presence of a dehydrating agent at elevated temperatures. A more detailed description of the preparation of triazole polymers used as coatings in this invention is given in copending U.S. patent application, Ser. No. 275,196 to Lilyquist et al., filed Apr. 24, 1963, now abandoned.

The triazole polymers are conveniently applied to the metal surfaces from solutions in solvents. When applicating solutions of the triazole polymers are employed it is generally advantageous for the liquid dispersed formulation of the polymer, to be prepared or made up so as to contain between about 5 and about 30 percent by weight, preferably from about 10 to about 20 percent by weight, of the polymer. Application of such a solution can be made by brushing, spraying or dipping techniques at room temperature or above, depending upon the polymer concentration in the solution and the particular solvent system utilized for its preparation. Applicating solutions of the polymers may be made with such solvents as polyphosphoric acid, formic acid, or other suitable solvents or combination of solvents whose chemical properties will not damage the particular metal used. As is apparent the amount of such applicating solution that is spread over the metal surface being coated depends upon its solids content, the thickness that is desired in the finally obtained polymer coating, and the end use involved. This may be varied in any conventional manner to meet the requirements of the particular situation involved. In most applications, satisfactory results may be obtained when the thickness of the finally obtained coating is between about 0.1 and about 2.0 mils. Preferably, the thickness of the coating should be between about 0.5 and about 1.0 mil.

Generally, it is satisfactory to employ simply the dissolved polymer as the coating formulation. However, if desired, various other materials such as fillers, dyes, pigments, and the like may also be incorporated in the formulations of this invention to provide specific modified appearance or modified properties to the coatings.

The applied coating may be dried by permitting it to stand in the air at room temperature or by baking it on the metal surface. The drying time is dependent on the applying and drying techniques employed and the solvent system utilized. Thus, air drying ordinarily requires much longer periods than are required for baking. Preferably the coatings of this invention are dried by baking.

Best results are obtained when the metal surface being coated is efficiently cleaned of any scale, dirt, rust, and the like, before application of the coating is made. This may be accomplished by wiping or brushing or by use of chemical and/or solvent treating and cleaning agents for the surface.

Care should be taken in the practice of the invention to avoid use of too thin a solution of the polymer which may necessitate repeated applications in order to obtain a suitable continuous coating thickness. Too thick a solution, such as one that contains more than about 30 percent of the resin, frequently causes difficulties due to excessive viscosity and may prevent an even distribution and thickness of the coating on the surface. This also may lead to difficulties in drying the thick coating.

Any metal normally employed for structural, high temperature applications, electrical conductance, and the like may advantageously be coated in the practice of the present invention. Thus such metals as iron, steel, aluminum, brass, copper and the like may be so protected.

The following examples of embodiments of the present invention further illustrate the principles and practice of the invention although they are not intended to limit specifically thereto. All parts are by weight unless otherwise indicated.

EXAMPLE 1

(A) *Preparation of poly(1,3-, 1,4-phenylene) hydrazide*

Two hundred ml. of anhydrous, distilled hexamethylphosphoramide and 19.4 grams (0.1 mole) of pure, dried isophathalohydrazide were charged into a 500 ml. 3-necked flask which had been thoroughly dried and purged with dry nitrogen. Solution was effected and the stirred solution was cooled to 2° C. Then 20.3 grams (0.1 mole) of freshly distilled, finely ground terephthaloyl chloride was added to the solution. The heat of reaction carried the internal temperature to a maximum of 21° C. which dropped to about 5° C. as the reaction progressed. After one hour the solution became too viscous to stir. The temperature was allowed to rise to room temperature, about 23° C., and the solution was poured into water and slurried in a Waring Blendor with repeated water washings. After a final wash with methanol the polymer was dried under a vacuum to give 32.6 grams of white, finely chopped product having an inherent viscosity, measured from a 0.5 percent solution in dimethylsulfoxide, of 1.514. The infrared absorption spectrum was determined using a film cast from a 10 percent solution in dimethylsulfoxide and was consistent with the polyhydrazide structure.

(B) *Preparation of poly-3,5(1,3-, 1,4-phenylene)4-phenyl-1,2,4-triazole*

Seven and two-tenths grams of the poly(1,3-, 1,4-phenylene) hydrazide prepared above was added to a solution of 28 grams of aniline in 150 grams of polyphosphoric acid at a temperature of 250° C. The temperature was raised to 260° C. and maintained for 90 minutes. The resulting dark solution was poured into a large volume of water to precipitate the triazole polymer. The polymer was filtered and slurried successively in hot 5 percent sodium hydroxide, water and methanol and then filtered and dried. Nine and five tenths grams of triazole polymer having an inherent viscosity of 0.54 was obtained. The polymer was then extracted with refluxing diethylene glycol monoethyl ether for one hour. The residual polymer had an inherent viscosity of 1.15 and was stable to weight-loss up to 530° C.

The infrared spectrum of this polymer was consistent with those obtained from known model compounds, 1,4-bis[3,4-diphenyl-5(1,2,4-triazolze)] benzene, 1,3-bis[3,4-diphenyl-5(1,2,4-triazole)] benzene, and 3,4,5-triphenyl-1,2,4-triazole.

EXAMPLE 2

*Poly-3,5(1,3-, 1,4-phenylene)4-phenyl-1,2,4-triazole as an insulating coating for electrical wiring and plates*

Several pieces of No. 16 B.C. copper wire about one foot in length and several panels of rolled copper sheet 2 inches by 5 inches by 0.03 inch were thoroughly cleaned and soaked in a pickling solution consisting of 25 percent by volume of concentrated nitric acid in water. After 5 minutes in the pickling bath, the panels and pieces of wire were thoroughly rinsed with water and with acetone and dried. The panels and wire were then coated by dipping them into a 10 percent solution of poly-3,5(1,3-, 1,4-phenylene)4-phenyl-1,2,4-triazole in formic acid. The polymer used above was prepared according to the procedure of Example 1 and had an inherent viscosity of 0.964. The coated panels and wire were then allowed to drain and air dry from a vertical position. The panels and wire were further dried in an oven at 75° C. for several hours. The coating adhered well to the metal surfaces of both the wire and the panels. The coated copper wire could be bent into a loop around a ¼-inch mandrel with no cracking or loosening of the coating. The copper panel showed no cracking or loosening of the coating on either flex or compression bending through an angle of 180°.

A Wilkinson pencil hardness of 7H was determined from the coated copper plate. In this test, lead pencils of increasing hardness are drawn across the varnish film one is found which will not cut the varnish, leaving a black pencil mark on the surface, whereas the next harder pencil will cut through the varnish without leaving a black mark. The number on the harder pencil is then used to express or designate the hardness of the varnish.

The dielectric strength of the coating was measured using the copper panels which were prepared according to ASTM designation D115–55 and tested according ASTM designation D149. An average dielectric strength of 2,340 volts per mil was obtained from 4 measurements made at 23° C. using a copper panel having a coating thickness of 0.0015 inch. A similarly coated panel which had been heat conditioned at 3000° C. for 3 hours gave an average dielectric strength value of 3,512 volts per mil when measured in the same manner. An average dielectric strength of 2,930 volts per mil was obtained from measurements made at 150° C. using coated panels which had received no previous heat conditioning treatment. For heat conditioned panels (300° C. for one hour) an average dielectric strength of 2,880 volts per mil was obtained from measurements made at 150° C. The dielectric constant of the polymer used to coat the copper test panels was found to be 2.1 when measured at a 100 kilocycles at 23° C. using free self-supporting films prepared from the same polymer solution used to coat the copper test panels.

EXAMPLE 3

*Poly-3,5(1,3-, 1,4-phenylene)4-phenyl-1,2,4-triazole as an adhesive for metals*

Two stainless steel strips 6 inches by 1 inch by 0.03 inch were thoroughly cleaned and dried. The strips were cemented together lengthwise by a one square inch lap joint using a 30 percent solution of poly-3,5(1,3-, 1,4-phenylene)4-phenyl-1,3,4-triazole in formic acid. The polymer used above was prepared according to the procedure of example 1 and had an inherent viscosity of 0.964. The joint was clamped with a C clamp having a clamping surface 1 inch in diameter and the clamped specimen was baked at 80° C. for 16 hours. Stainless steel pins, ⅛ inch diameter by ½ inch length, were inserted in the opposite ends of the cemented test strip approximately ½ inch from each edge. The lap shear strength of the cemented joint was tested using an Instron Tester. The steel pins inserted above were used as supports for the Instron Tester clamps. The metal failed at the clamps under a stress of 885 lbs., but the cemented joint remained intact.

EXAMPLE 4

(A) *Poly-3,5(1,3-, 1,4-phenylene)4-phenyl-1,2,4-triazole as protective coatings for steel surfaces*

Several number 316 stainless steel panels 2 inches by 5 inches by 0.03 inch were thoroughly cleaned with scouring powder, rinsed with distilled water and with acetone, and coated on one side only with a thin film of a 10 percent solution of poly-3,5(1,3-, 1,4-phenylene)4-phenyl-1,2,4-triazole in 98 percent formic acid. The polymer used above was prepared according to the procedure of Example 1 and had an inherent viscosity of 0.964. The panels were allowed to air dry in a near vertical position and were further dried by baking 24 hours in an oven at 78° C. The coated test panels were then baked in a circulating air oven for 1 to 2 hours at temperatures of 300, 350, and 400° C. After each period of baking, a sample panel was removed and tested. The following test procedures were used.

(1) Visual observation of the coating surface to determine appearance, color change, formation of bubbles or voids, cracking or checking, and flow ripples.

(2) Hardness by using the Wilkinson Pencil Hardness Method as described in Example 1.

(3) Flexibility and adhesion by (a) bending the panel back through an angle of 180°, (b) cutting a series of crossed-hatch lines 1/16 inch apart through the coating to the metal substrate using a razor blade and removing loosened material with Scotch brand adhesive tape, (c) pressing a 1/4 inch steel ball into the coated panel to a depth of about 1/8 inch and observing the depressed area under a microscope for cracks or flaws in the coating of the depressed area, (d) puncturing the coated panel with a sharp metal punch struck by hammer blow and observing the puncture under a microscope for adhesion of the coating to the rupture metal fragments, and (e) shearing a narrow strip of coated panel from along one edge and observing the adhesion of the coating at the sheared edge.

(4) Compressibility by bending the panel forward through an angle 180°, so that the coated surface was on the inside of the bend, and observing the surface for cracking or loosening of the coating.

Table 1 gives the observations and results of the above tests when applied to number 316 stainless steel panels baked at temperatures ranging from 300–400° C. for one to two hours successively at each temperature. All tests were made after panels were cooled to room temperature and the results of these tests are shown in Table 1 which follows.

TABLE 1
[Test results of Poly-3,5(1,3-, 1,4-phenylene)4-phenyl-1,2,4-triazole coated on stainless steel]

| Test | Baking temperature (° C. for 1-2 hours) | | |
|---|---|---|---|
| | 300 | 350 | 400 |
| Visual Observation | Clear, amber color; hard, glossy surface; free of flaws. | Light, brown color; hard, glossy surface; free of flaws. | Dark brown color; hard, glossy surface; free of flaws. |
| Pencil Hardness | 8H | 8H | 7H-8H. |
| Flexibility on Bending through 180° | Excellent, no cracking or loosening | Excellent, no cracking or loosening | Excellent, no cracking or loosening. |
| Compressibility on Bending through 180° | Excellent, no cracking or separation | Excellent, no cracking or separation | Excellent, no cracking or separation. |
| Steel Ball Depression | Excellent, no cracking or breaking of depressed surface. | Excellent, no cracking or breaking of depressed surface. | Excellent, no cracking or breaking of depressed surface. |
| Puncture Adhesion | Excellent, coating adheres to metal fragments. | Excellent, coating adheres to metal fragments. | Excellent, coating adheres to metal fragments. |
| Shear Adhesion | Excellent, no peeling of coating at sheared edge. | Excellent, no peeling of coating at sheared edge. | Excellent, no peeling of coating at sheared edge. |
| Scratch Adhesion | Excellent, none of the coating was removed from the cross-hatch area with the adhesive tape. | Excellent, none of the coating was removed from the cross-hatch area with the adhesive tape. | Excellent, none of the coating was removed from the cross-hatch area with the adhesive tape. |

A number 316 stainless steel panel, coated as described above, was baked at 400° C. for one hour, cooled to room temperature, tested for flexibility by bending through 180° C., and reheated in the bent form at 400° C. The panel was removed from the furnace after about 15 minutes and immediately immersed in cold water. The examination showed no cracking or checking of the coating over either the flat or bent surface.

A number 316 stainless steel panel, coated as described above was baked at 300° C. for 2 hours. It was then cooled to room temperature and placed in the freezer compartment of a refrigerator (−7° C.) for several hours. Immediately upon removal from the refrigerator, the panel was bent back through an angle of 180° and no cracking or loosening of the coating occurred. The test panel was then placed in a chest of solid carbon dioxide for several hours. The panel was removed from the chest and immediately bent back through an angle of 180° and no cracking or loosening of the coating was observed.

(B) *Poly-3,5(1,3-, 1,4-phenylene)4-phenyl-1,2,4-triazole as protective coatings for aluminum surfaces*

Aluminum test panels were cleansed and coated with poly-3,5(1,3-, 1,4-phenylene)4-phenyl-1,2,4-triazole as described in part (A) of this example. These panels were dried and baked at temperatures of 300° and 350° C. the tests described in part (A) of this example was also applied to these coated aluminum panels and results are given in Table 2 which follows.

TABLE 2
[Test results of poly-3,5(1,3-, 1,4-phenylene)4-phenyl-1,2,4-triazole coated on aluminum]

| Test | Baking temperature (° C. for 2 hours) | |
|---|---|---|
| | 300 | 350 |
| Visual Observation | Clear, amber color; hard, glossy surface; free of flaws | Light brown color; hard, glossy surface; free of flaws. |
| Pencil Hardness | 8H | 7H-8H. |
| Flexibility on Bending Through 180 degrees | Excellent, no cracking or loosening | Excellent, no cracking or loosening. |
| Compressibility on Bending Through 180 degrees | Good, slight separation from metal, no cracking of coating. | Good, slight separation from metal, no cracking of coating. |
| Steel Ball Depression | Excellent, no cracking or separation of coating | Excellent, no cracking or separation of coating. |
| Puncture Adhesion | Good, coating adheres to metal fragments, no cracking except at rupture point. | Good, coating adheres to metal fragments, no cracking except at rupture point. |
| Shear Adhesion | Excellent, no chipping or loosening of coating | Excellent, no chipping or loosening of coating. |
| Scratch Adhesion | Excellent, none of the coating was removed by tape | Good, about 10% of the coating was removed by the tape. |

(C) *Poly-3,5(1,3-, 1,4-phenylene)4-phenyl-1,2,4-triazole as protective coatings for brass surfaces*

Several brass panels 2 inches by 5 inches by 0.03 inch were scoured with cleansing powder, rinsed thoroughly with water and further cleaned in a pickling bath consisting of 25 percent by volume of nitric acid in water. After about 5 minutes in this bath, the panels were removed, thoroughly rinsed with water and acetone and dried. They were then coated with poly-3,5(1,3-, 1,4-phenylene)4-phenyl-1,2,4-triazole as described in part (A) of this example. After air drying several hours, the panels were further dried in an oven at 75° C. These panels were then baked at temperatures of 300–350° C. The tests described in part (A) of this example were also applied to these coated brass panels and the results were given in Table 3 which follows.

TABLE 3

[Test results of poly-3,5(1,3-, 1,4-phenylene)4-phenyl-1,2,4-triazole coated on brass]

| Test | Baking Temperature (° C. for one hour) | |
|---|---|---|
| | 300 | 350 |
| Visual Observation | Clear, amber color; hard, glossy surface; free of flaws | Clear, brown color; hard, glossy surface; free of flaws |
| Pencil Hardness | 8H | 8H |
| Flexibility on Bending Through 180 degrees | Good, no cracking, slight loosening at edge | Excellent, no cracking or loosening. |
| Compressibility on Bending Through 180° | Fair, no cracking, some buckling and loosening | Good, no cracking, slight buckling at edges. |
| Steel Ball Depression | Poor, coating cracked and pulled from metal | Excellent, no cracking or loosening of coating. |
| Shear Adhesion | Excellent, no chipping or loosening | Fair, slight loosening and chipping on undersurface. |

As many widely different embodiments of this invention may be made without departing from the spirit and scope thereof, it is to be understood that the invention is not limited to the specific embodiment thereof, except as defined in the appended claims.

What is claimed is:

1. A method for coating a metal surface which comprises applying to the surface a solution comprising a triazole polymer comprised predominantly of recurring structural units having the general formula

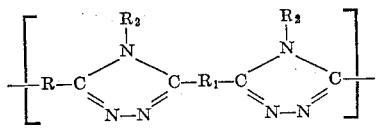

wherein R and $R_1$ are divalent aromatic hydrocarbon radicals selected from the group consisting of single, multiple and fused ring radicals, and $R_2$ is a phenyl radical and a solvent therefor, then drying the solvent from said applied solution to deposit a continuous coating layer of said triazole polymer on said metal surface.

2. A method for coating a metal surface which comprises applying to the surface a solution comprising from about 5 to about 30 percent by weight of a triazole polymer comprised predominantly of recurring structural units having a general formula

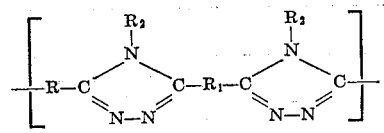

wherein R and $R_1$ are divalent aromatic hydrocarbon radicals selected from the group consisting of single, multiple and fused ring radicals, and $R_2$ is a phenyl radical and a solvent therefor, then drying the solvent from said applied solution to deposit a continuous coating layer of said triazole polymer on said metal surface.

3. A method for coating a metal surface which comprises applying to the surface a solution comprising from about 10 to 20 percent by weight of a triazole polymer comprised predominantly of recurring structural units having the general formula

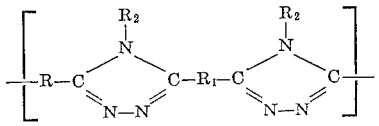

wherein R and $R_1$ are divalent aromatic hydrocarbon radicals selected from the group consisting of single, multiple and fused ring radicals, and $R_2$ a phenyl radical, and a solvent therefor, then drying the solvent from said applied solution to deposit continuous coating layer of said triazole polymer on said metal surface.

4. A method as defined in claim 3 wherein the triazole polymer used is poly-3,5(1,3-, 1,4-phenylene)4-phenyl-1,2,4-triazole.

5. A method as defined in claim 3 wherein said metal surface is comprised of copper.

6. A method as defined in claim 3 wherein said metal surface is comprised of steel.

7. A method as defined in claim 3 wherein said metal surface is comprised of aluminum.

8. A method as defined in claim 3 wherein said metal surface is comprised of brass.

9. As an article of manufacture a metal object having a coating on its surface that is comprised of a layer of a triazole polymer comprised predominantly of recurring structural units having the general formula

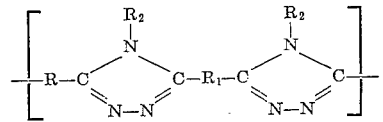

wherein R and $R_1$ are divalent aromatic hydrocarbon radicals selected from the group consisting of single, multiple and fused ring radicals, and $R_2$ a phenyl radical.

10. As an article of manufacture a metal object having a coating on its surface that is comprised of a layer of a triazole polymer comprised predominantly of recurring structural units having the general formula

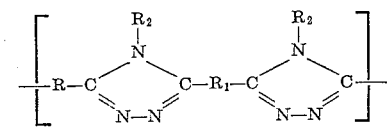

wherein R and $R_1$ are divalent aromatic hydrocarbon radicals selected from the group consisting of single, multiple and fused ring radicals, and $R_2$ a phenyl radical, said coating having a thickness between about 0.1 and 2.0 mils.

11. As an article of manufacture a metal object having a coating on its surface that is comprised of a layer of a triazole polymer comprised predominantly of recurring structural units having the general formula

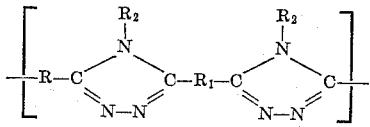

where R and $R_1$ are divalent aromatic hydrocarbon radicals selected from the group consisting of single, multiple and fused ring radicals, and $R_2$ a phenyl radical, said coating having a thickness between about 0.5 and 1.0 mils.

12. An article of manufacture as defined in claim 11 wherein said triazole polymer is poly-3,5(1,3-, 1,4-phenylene)4-phenyl-1,2,4-triazole.

13. An article of manufacture as defined in claim 11 wherein said metal object is comprised of copper.

14. An article of manufacture as defined in claim 11 wherein said metal object is comprised of steel.

15. An article of manufacture as defined in claim 11 wherein said metal object is comprised of aluminum.

16. An article of manufacture as defined in claim 11 wherein said metal object is comprised of brass.

17. As an article of manufacture two metal objects joined together by an adhesive comprised of a triazole polymer comprised predominantly of recurring structural units having the general formula

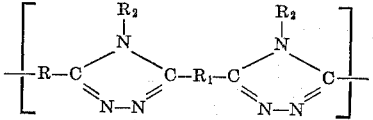

wherein R and $R_1$ are divalent aromatic hydrocarbon radicals selected from the group consisting of single, multiple and fused ring radicals, and $R_2$ a phenyl carbon.

References Cited by the Examiner

UNITED STATES PATENTS

| | | | |
|---|---|---|---|
| 2,512,600 | 6/1950 | Bates et al. | 260—78.4 |
| 2,512,625 | 6/1950 | Fisher et al. | |
| 2,615,862 | 10/1952 | McFarlane et al. | 260—78 |
| 2,723,275 | 11/1955 | Kaiser et al. | 260—88.3 X |
| 3,130,182 | 4/1964 | Frazer | 260—78 |

FOREIGN PATENTS 47,442　2/1951　Canada.

ALFRED L. LEAVITT, *Primary Examiner.*

RALPH S. KENDALL, *Examiner.*

UNITED STATES PATENT OFFICE
CERTIFICATE OF CORRECTION

Patent No. 3,318,728　　　　　　　　　　　　　　　　　May 9, 1967

Marvin R. Lilyquist

It is hereby certified that error appears in the above numbered patent requiring correction and that the said Letters Patent should read as corrected below.

Column 4, line 26, for "3000° C." read -- 300° C. --.

Signed and sealed this 21st day of November 1967.

(SEAL)
Attest:

Edward M. Fletcher, Jr.　　　　　　　　　　　　　　　EDWARD J. BRENNER
Attesting Officer　　　　　　　　　　　　　　　　　　Commissioner of Patents